No. 674,886. Patented May 28, 1901.
J. O. E. TROTZ.
GAS PRODUCER.
(Application filed June 18, 1900.)
(No Model.) 4 Sheets—Sheet 3.
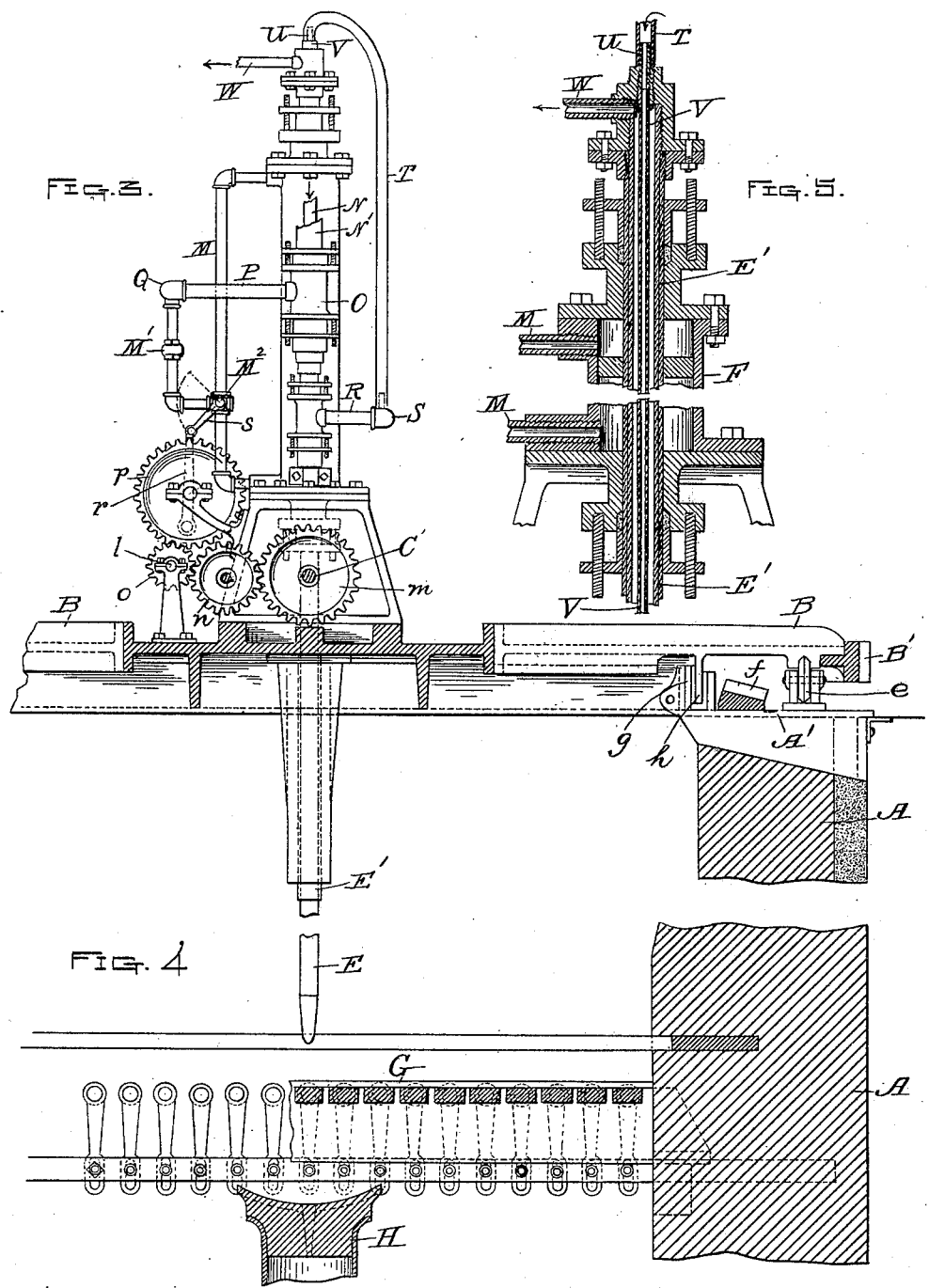

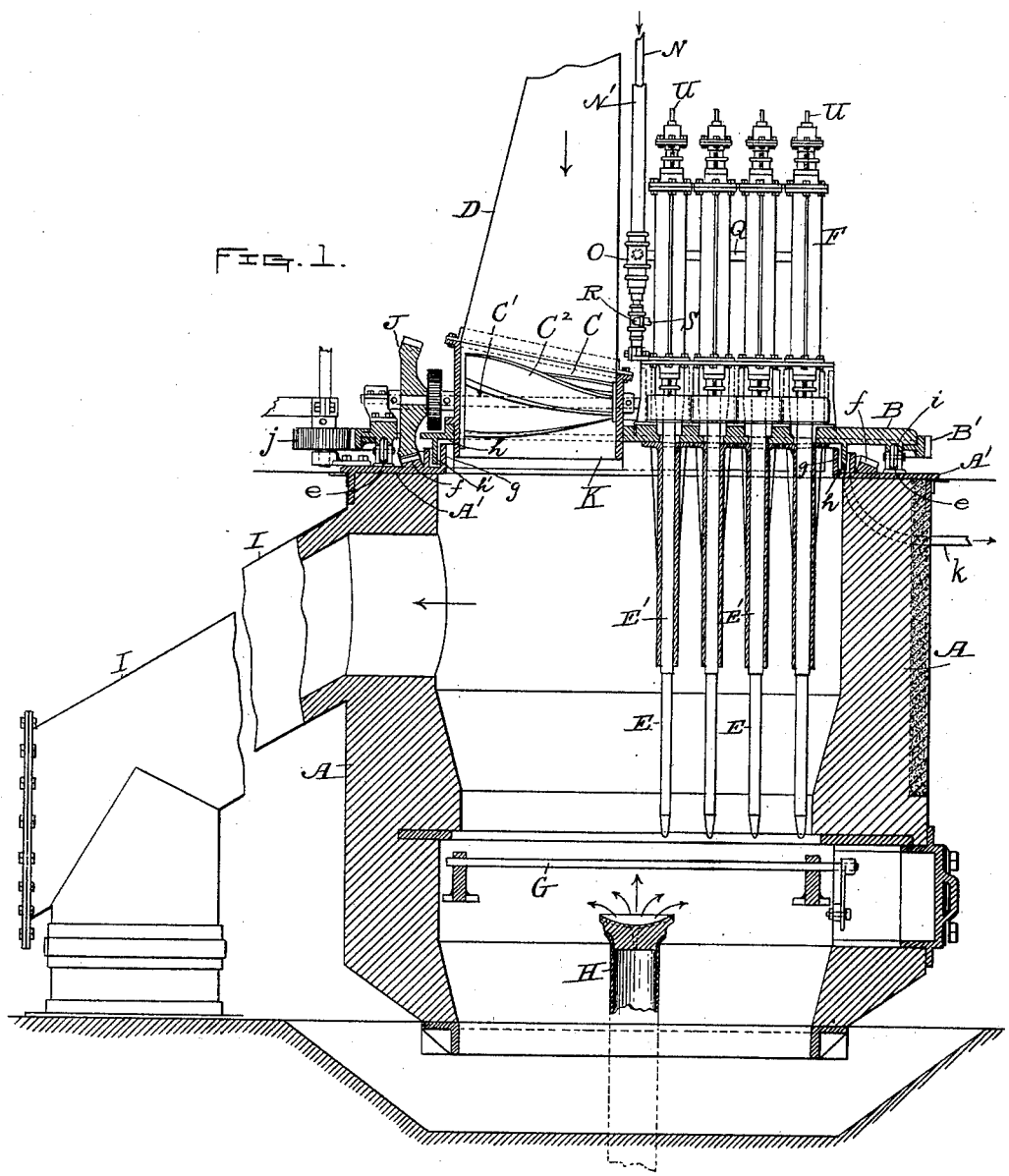

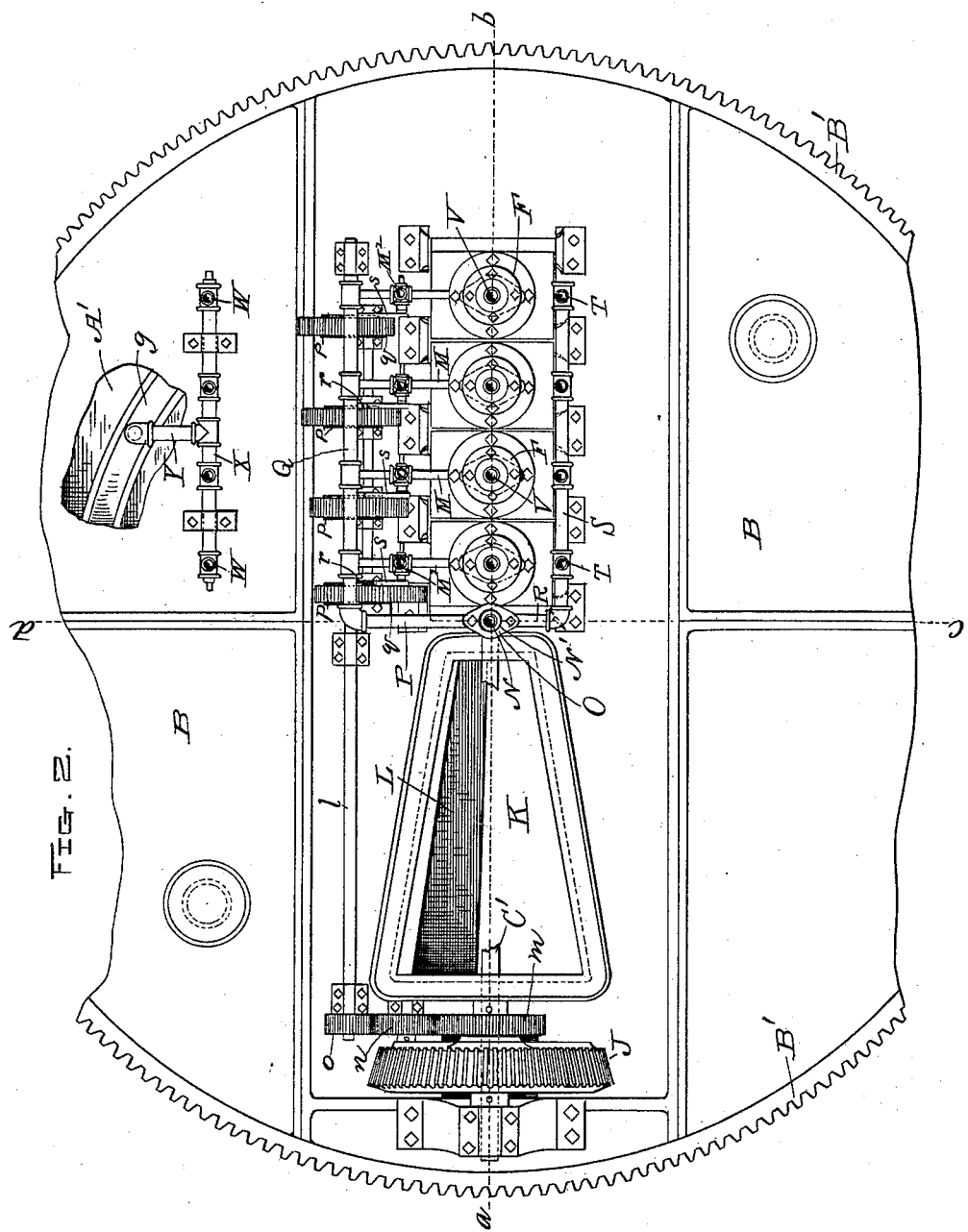

No. 674,886. Patented May 28, 1901.
J. O. E. TROTZ.
GAS PRODUCER.
(Application filed June 18, 1900.)
(No Model.) 4 Sheets—Sheet 4.
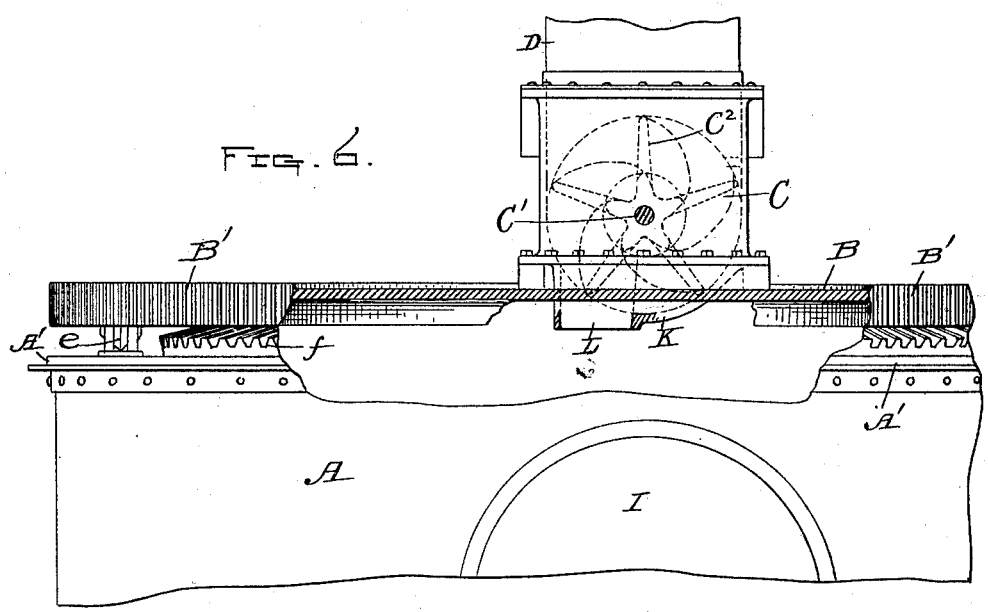
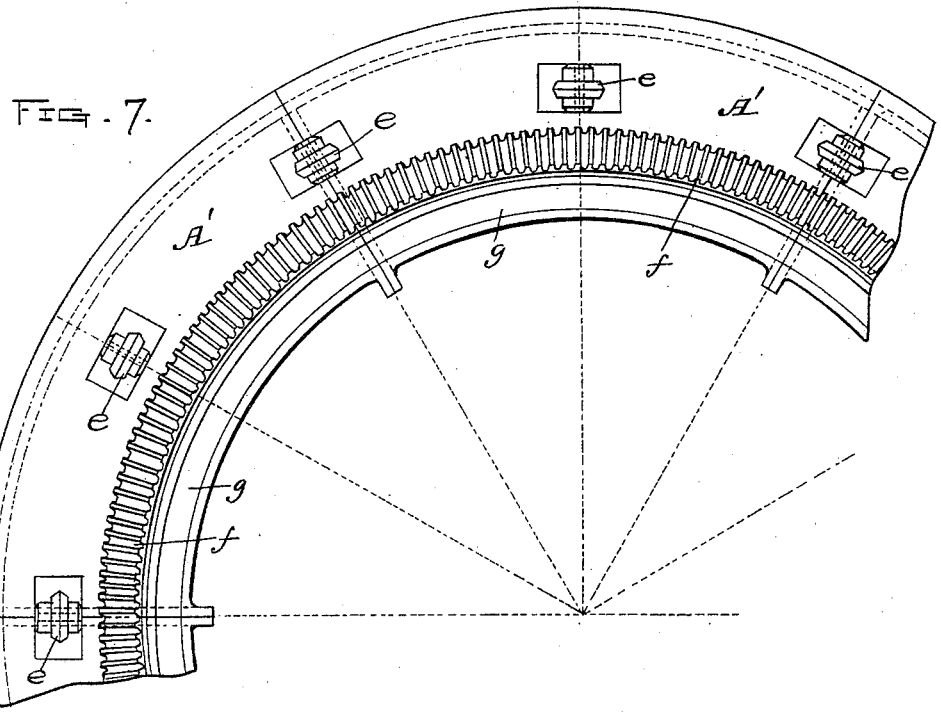
Witnesses:
W. B. Nourse.
E. N. Barker.
Inventor:
Johan Otto Emanuel Trotz
By A. A. Barker, Atty

UNITED STATES PATENT OFFICE.

JOHAN OTTO EMANUEL TROTZ, OF WORCESTER, MASSACHUSETTS.

GAS-PRODUCER.

SPECIFICATION forming part of Letters Patent No. 674,886, dated May 28, 1901.

Application filed June 18, 1900. Serial No. 20,625. (No model.)

*To all whom it may concern:*

Be it known that I, JOHAN OTTO EMANUEL TROTZ, of the city and county of Worcester, in the State of Massachusetts, have invented certain new and useful Improvements in Gas-Producers; and I do hereby declare that the following is a full, clear, and exact description thereof, reference being had to the accompanying drawings, forming a part of this specification, and in which—

Figure 1 represents a central vertical section, partly in elevation, of a gas-producer embodying my improvements, said section being taken at the point indicated by line $a\,b$, Fig. 2. Fig. 2 represents, upon an enlarged scale, a top or plan view of the parts of the producer to which my improvements relate, with the coal-distributer left off, all the following figures, except Fig. 5, being shown upon the same enlarged scale. Fig. 3 is a vertical section at the point indicated by line $c\,d$, Fig. 2, of part of the top of the producer, partly in elevation, showing a side view of the upper end of the series of coal-pokers and mechanism for operating them. Fig. 4 is a vertical section at the same point as Fig. 3 through part of the lower portion of the producer. Fig. 5 is a central longitudinal section, upon a still larger scale than the other figures, through the upper and lower ends of one of the pistons which operate the pokers vertically. Fig. 6 is a side view of a portion of the upper part of the producer, partly in section, with the poking mechanism left off and showing in dotted lines an inner end view of the coal-distributing device; and Fig. 7 is a plan of part of the top of the producer with the cover removed and showing part of the wheels or trucks upon which said cover rests and turns and also showing the water-sealing trough, all as will be hereinafter described.

The object of my invention is to provide a gas-producer whereby the coal, which is automatically and evenly deposited over the grate-surface by a distributing device covered in a separate application, may be automatically poked and stirred or agitated by means of suitable pokers having reciprocating vertical and circular movements imparted thereto, as will be hereinafter described.

My invention consists of a series of vertical pokers arranged, preferably, in a radial line from the vertical center of the apparatus, mounted on a rotary cover, and having means combined therewith for automatically imparting intermittent reciprocating vertical movements thereto independent of the circular movements of the cover, as and for the purpose hereinafter more fully set forth.

To enable those skilled in the art to which my invention appertains to better understand the nature and purpose thereof, I will now describe it more in detail, with reference to the accompanying drawings.

In said drawings, A represents the vertical walls of the producer; B, the rotary cover thereof, previously alluded to; C, the coal-distributer, also mounted on said cover; D, the coal-chute for conducting the coal to said distributer; E, the vertical intermittently-reciprocating pokers; F, the pistons, mounted on cover B, for imparting said vertical intermittent reciprocating movements to said pokers; G, the grate; H, the blast-pipe for introducing the air under said grate, and I the discharge-duct for conducting the gas from the producer.

The vertical wall A of the producer, which is circular, as is shown in the drawings, is capped by a metal plate A', upon which are mounted a series of vertically-arranged wheels $e$ and an annular toothed rack $f$. Said circular cap-plate also has formed at its inner edge an annular trough $g$ to receive an annular vertical flange $h'$ on a horizontal stationary plate $h$ to form a water seal when said trough is filled with water. The wheels $e$ are arranged about equidistant apart in a circular line around the top of plate A' and are fitted to turn in suitable bearings on said plate. The cover B is adapted to rest and turn on said series of wheels $e$, being provided on its under side with an annular groove $i$, in which the peripheries of the wheels fit and turn when the cover is rotated thereon. Said rotation may be performed in any suitable and convenient manner. In this instance the outer circular edge of the cover is provided with a toothed rack B' entirely around its circumference, which engages with a horizontally-arranged gear $j$, fitted to turn in suitable bearings and driven by any suitable driving mechanism which may be connected therewith. Said gear being small, a slow rotary movement is imparted to the cover B and parts mounted thereon, and by said rotation the distributer C is also rotated in the following manner: Said distributer C, as previously stated, is covered in a separate application; but in order to make clear the purpose and advantages of the poking devices embodied in this application it is deemed best to give a general description of the distributer. Upon the shaft C' of said distributer is mounted a bevel-gear J, which engages with the annular toothed rack $f$ on plate A'. It is therefore obvious that when the cover B is rotated, as aforesaid, said bevel-gear J being caused to travel over said rack causes it to be turned, and thereby turns the distributer.

It is apparent that since the coal is deposited in circles by the rotation of the cover upon which the distributer is mounted and since the diameter of the grate-surface increases from the center out a proportionate amount of coal increasing from the center toward the outside of said grate-surface must be deposited thereon to evenly distribute the same over its whole surface, or, in other words, the coal must be deposited in greater quantity and more rapidly at the outer edge of the grate-surface on account of the greater diameter or circular distance to be traversed and covered than at points nearer the center. In order that the distribution of coal may be thus graduated from a light deposit near the center of the grate-surface and gradually increasing to the outer edge thereof, I make the longitudinal webs or blades $C^2$ of the distributer narrow at their inner ends near the vertical center of the producer and gradually increasing in width from said point to the outer ends thereof, thus forming pockets for the coal between said webs or blades very shallow at the inner end of the distributer and increasing in depth and capacity toward the outer end thereof, as is fully shown in the drawings. By this construction it is obvious that the coal as it is deposited from the chute D onto the distributer is in turn discharged from said distributer onto the grate-surface in gradually-decreasing quantity from the outside to the center of said grate-surface, and in consequence an even distribution or deposit of uniform depth is constantly maintained over the whole grate-surface. To facilitate said uniform distribution, the blades of the distributer are helically arranged, as is shown in Figs. 1 and 5 of the drawings, and a cone-shaped box K is formed at the bottom of the coal-chute, in which the distributer fits, having an opening L for the discharge of the coal therefrom into the combustion-chamber of the producer. The coal is not discharged directly from the distributer, but is pushed from said box or receptacle into said chamber. The coal discharged from the chute lies in the pockets between the helically-arranged radial blades $C^2$ and the inner circular surface of box L until the edge of each blade arrives at the discharge-opening L of said circular cone-shaped box, when it is gradually pushed forward by the rotation of the distributer from said point of discharge into the combustion-chamber. The blades $C^2$ being helically arranged, as aforesaid, one part of one blade will be pushing the coal from a certain point in the box while another part of another blade is pushing it from a different point in said box, and they are in practice so arranged that a constant even discharge is maintained the length of the distributer, with an increase in quantity of course, as previously described, from the inner to the outer end of said distributer. The inner narrow end of one of the blades arriving at the opening L, the spiral edge thereof commences to push the thin layer of coal at said end through said opening, and as the distributer continues to rotate the edge of a wider and still wider part of the blade arrives at the opening, and consequently a gradual increase in the discharge of coal is effected, as aforesaid. Before the edge of each blade at its widest point—at the outer end—has passed by the edge of opening L the inner narrow end of the next succeeding blade has come into action for discharging the coal, and therefore a constant discharge is maintained the whole length of the distributer, as also previously stated. While the coal is being thus evenly deposited of a uniform depth over the grate-surface by the automatic distributer just described it is necessary in order to obtain a uniform combustion to poke said coal during said distributing process, and to do this I employ the automatic poking devices previously referred to and which will now be described.

Various ways may be employed for imparting to the pokers intermittent reciprocating vertical movements independent of the circular movements imparted thereto by the rotation of the cover upon which they are mounted, as previously described. In this instance I have shown said result as being accomplished by means of mechanism operated by pneumatic pressure. I have shown in this instance four pokers; but I do not limit myself to this number. They are arranged vertically in line radially from the vertical center of the producers. Each poker is operated independently, but by mechanism substantially alike. Being arranged in a radial line, as aforesaid, it is obvious that the circumference of the circle which each travels increases from the inner to the outer one. Therefore the inner poker does not have to be operated as many times in each rotation as the others in poking the coal at equal distances apart and is consequently operated at longer intervals between each downward stroke than the others. The speed of the stroke itself may be the same for all of them; but the interval between said strokes must be reduced less and less in proportion to the increase in the circumferential distance that each poker has to travel at each revolution of cover B, each poker being designed to punch the coal the same distance apart—about one foot apart in practice. The pokers E are constructed and arranged to be thus operated in the following manner: Said pokers are an extension of and form a part of the piston-rods E' and are operated in the same manner as in other pneumatic pistons, the cylinder of each piston being connected at each end with an air-supply pipe M, which may be supplied with air under pressure from any desired source. In this instance I have shown said air as being supplied from a combined air and water pipe comprising the inner water-pipe N and the outer air-pipe N', having a distributing device O combined therewith, into which the air and water flow and are distributed, the air through the pipe P to a pipe Q, with which the pipes M connect, and the water through a pipe R to a pipe S, from which connection is made by rubber tubing T with a nipple U at the upper end of a pipe V, extending down through each piston-rod E' and poker E to maintain a constant flow of water therethrough to protect said pokers from the intense heat in the combustion-chamber of the producer. The water passing down through said pipes V flows back up around the outside of the same and overflows at the top through a pipe W at the upper end of each piston F, the piston-rods and pokers being made hollow and large enough to form a space around pipes V for the purpose. Each overflow-pipe W connects with a pipe X, and from said pipe X a pipe Y conducts the water to the annular trough g, previously described, for forming a water seal around the top of the apparatus. The water overflowing from said trough g may be conducted by a pipe k to any desired point.

Each air-pipe M is provided with a valve M', adapted to be operated by hand for controlling the supply to the pistons F, and also with a valve M² for automatically controlling said air-supply and imparting to each poker the independent vertical movements previously described. This result is effected by means of mechanism independently connected with each valve M², as follows: A shaft l, fitted to turn in suitable bearings, is turned by the shaft C', upon which the distributer C is mounted, through the gears m, n, and o. Upon said shaft l, opposite to each piston, is mounted a gear p, which engages with a gear q. To the side of said gear q is eccentrically pivoted a crank-arm r, which is pivoted at its outer end to a crank-arm S on valve M². By this arrangement it is obvious that when shaft l turns, the gears p and q and crank-arms r and s are operated and said valve M² opened or closed, according to the positions of said crank-arms. In practice said gears and crank-arms are constructed and arranged so as to operate each poker with shorter intervals between the strokes than the one next to it, from the inner to the outer poker, the inner poker being moved with quite slow intermittent reciprocating movements, while the outer one is moved quite rapidly, for the purpose previously described, this result being effected by graduating the sizes of each pair of gears p q to the speed required to reciprocate their respective pokers at the desired speed.

By the foregoing construction of automatically distributing the coal evenly and of uniform depth over the whole grate-surface and also automatically poking the coal at regular intervals and distances apart, a perfect combustion is at all times maintained, which results in a large saving in fuel and labor and in the production of a superior quality of gas.

Having described my invention, what I claim as new, and desire to secure by Letters Patent, is—

1. In a gas-producer, a series of poking devices mounted on a suitable support, and vertically and radially arranged in the furnace over the grate, each of said devices comprising a poker, means for supporting and guiding it in its reciprocating movements, means for reciprocating said pokers at varying speeds from the inner to the outer one of the radial line or series and means for supplying a cooling medium to the pokers, substantially as and for the purpose set forth.

2. In a gas-producer, the combination of rotary cover B and means for supporting and turning it, with a series of vertically-arranged coal-poking devices mounted on said rotary cover, and reciprocated up and down automatically, said devices each comprising a piston E' terminating at the bottom in the poker E, suitable cylinders for said pistons to work in and means for automatically operating said pistons to impart to said pokers the aforesaid vertical reciprocating movements, as the series of poking devices are moved around in circles with said rotary cover B, substantially as and for the purpose set forth.

3. In a gas-producer, the combination of rotary cover B and means for supporting and turning it, with a series of vertically and radially arranged coal-poking devices mounted on said rotary cover and reciprocated up and down automatically, said devices each comprising a piston E' terminating at the bottom in the poker E, suitable cylinders for said pistons to work in and means for automatically reciprocating said pistons and pokers at varying speeds from the inner to the outer one of the radial line or series as they are moved around in circles with said rotary cover B, substantially as and for the purpose set forth.

4. In a gas-producer, the combination of rotary cover B and means for supporting and turning it, with a series of vertically-arranged coal-poking devices mounted on said rotary cover and reciprocated up and down automatically, said devices each comprising a piston E', terminating at the bottom in the poker E, suitable cylinders for said pistons to work in, means for automatically reciprocating said pistons and pokers as they are moved around in circles with said rotary cover B, and means for supplying a cooling medium to the pistons and pokers, substantially as and for the purpose set forth.

5. In a gas-producer, the combination of rotary cover B and means for supporting and turning it, with a series of vertically and radially arranged coal-poking devices mounted on said rotary cover, and reciprocated up and down automatically, said devices each comprising a piston E' terminating at the bottom in the poker E, suitable cylinders for said pistons to work in, means for automatically reciprocating said pistons and pokers at varying speeds from the inner to the outer one of the radial line or series as they are moved around in circles with said rotary cover B, and means for supplying a cooling medium to the pistons and pokers, substantially as and for the purpose set forth.

6. In a gas-producer, the wall A thereof, stationary cover A', rotary cover B, and means for supporting and rotating said cover B in combination with the coal-distributer shaft C' means for turning said shaft, gear $m$ mounted thereon, gears $n$, $o$, shaft $l$, gears $p$, $q$, their supports and bearings, cranks $r$, $s$, valve $M^2$ piping M, connected with a suitable supply-pipe and with the pistons F, said pistons, their rods and the coal-pokers, the latter forming an extension of said piston-rods, substantially as and for the purpose set forth.

7. In a gas-producer, the combination of shaft C' and gear $m$ mounted thereon, with gears $n$, $o$, shaft $l$, gears $p$, $q$, their supports and bearings; cranks $r$, $s$, valve $M^2$, piping M, connected with a suitable supply-pipe and with the pistons F, said pistons, their rods and the coal-pokers, the latter forming an extension of said piston-rods, substantially as and for the purpose set forth.

8. In a gas-producer, the combination of shaft C', gear $m$ mounted thereon and the combined air and water supply pipe N, N', with gears $n$, $o$, shaft $l$, gears $p$, $q$, their supports and bearings; cranks $r$, $s$, valve $M^2$, piping M connected with pistons F, pipe Q, pipes P distributer O, pipe R, pipes S, flexible pipe T, pistons F, their rods and the coal-pokers, the latter forming an extension of said piston-rods, substantially as and for the purpose set forth.

JOHAN OTTO EMANUEL TROTZ.

Witnesses:
A. A. BARKER,
W. B. NOURSE.